United States Patent [19]

Matsuoka et al.

[11] 4,303,903
[45] Dec. 1, 1981

[54] PRESSURE SENSITIVE APPARATUS

[75] Inventors: Yoshitaka Matsuoka; Michitaka Shimazoe; Yoshimi Yamamoto; Mitsuo Ai; Keiji Miyauchi; Hideyuki Nemoto; Masatoshi Tsuchiya; Masanori Tanabe, all of Ibaraki, Japan

[73] Assignee: Hitachi, Ltd., Tokyo, Japan

[21] Appl. No.: 77,838

[22] Filed: Sep. 21, 1979

[30] Foreign Application Priority Data

Sep. 22, 1978 [JP] Japan .................. 53-115918

[51] Int. Cl.³ .......................................... H01L 10/10
[52] U.S. Cl. .......................................... 338/4; 338/42
[58] Field of Search .............. 338/4, 36, 42; 73/720, 73/721, 726, 727; 357/26; 29/610 SG

[56] References Cited

U.S. PATENT DOCUMENTS

| | | | |
|---|---|---|---|
| 3,397,278 | 10/1966 | Pomerantz | 174/52 |
| 3,918,019 | 11/1975 | Nunn | 338/42 |
| 4,019,388 | 4/1977 | Hall et al. | 338/4 X |
| 4,129,042 | 12/1978 | Rosvold | 338/42 X |
| 4,168,630 | 4/1979 | Shirouzu et al. | 338/42 |

FOREIGN PATENT DOCUMENTS 1248087 9/1971 United Kingdom .................. 73/727

*Primary Examiner*—C. L. Albritton
*Attorney, Agent, or Firm*—Craig and Antonelli

[57] ABSTRACT

A pressure transducer comprising a silicon diaphragm on which a semiconductor strain gauge is formed and which has a diaphragm portion deformable in response to a pressure, an insulating support which is made of borosilicate glass having the silicon diaphragm rigidly mounted thereon and which is provided with a pressure introducing hole in its central part, a metallic support which is cylindrical, which is made of an iron-nickel alloy similar in the thermal expansion coefficient to the borosilicate glass and on which the glass insulating support is rigidly mounted, and a metallic housing within which the integrated structure consisting of the silicon diaphragm, the glass insulating support and the metallic support is arranged; the silicon diaphragm, the insulating support and the metallic support being joined by the anodic bonding, the metallic support being rigidly welded to the metallic housing at its lower end part.

8 Claims, 3 Drawing Figures

PRESSURE SENSITIVE APPARATUS

BACKGROUND OF THE INVENTION

This invention relates to a pressure sensitive apparatus. More particularly, it relates to a pressure sensitive apparatus of improved novel structure conforming with the semiconductor strain gauge type which exploits the piezoresistance effect and in which a resistance is formed in a semiconductor single crystal by diffusion.

Heretofore, there has been widely known a pressure sensitive apparatus of the semiconductor strain gauge type wherein a p-type resistance region is selectively diffused in an n-type silicon semiconductor single crystal to form a pressure sensitive element, a strain develops upon application of a pressure to the element, and a resistance change of the p-type resistor owing to the piezoresistance effect is measured so as to detect the value of the pressure.

In U.S. Pat. No. 4,019,388, for example, there is disclosed a pressure sensitive apparatus which has a silicon chip indirectly bonded to a stainless steel housing of an electronic pressure transmitter through an intermediate nickel-iron alloy. This indirect bonding prevents thermal cracking of the silicon chip due to the difference in thermal expansion between the stainless steel housing and the silicon chip. The holder assembly includes a borosilicate glass tube having the silicon chip bonded thereto which tube is soldered to the nickel-iron alloy holder by a eutectic alloy solder. In assemblage, the nickel-iron holder is first brazed to the stainless steel housing at a first temperature greater than the maximum non-destructive temperature of either the chip or the glass tube, and the glass tube is then soldered to the nickel-iron holder at a lower temperature which will not destroy the chip or the tube holder. However, the above-mentioned soldering is very troublesome, for example because the joined surface of the nickel-iron holder and the glass tube is coated with a thin chromium layer and a thin gold layer by evaporation or the like prior to the soldering.

Other relevant prior arts are as follows:

(1) U.S. Pat. No. 3,918,019, "MINIATURE ABSOLUTE PRESSURE TRANSDUCER ASSEMBLY AND METHOD";

This shows a silicon diaphragm assembly which is bonded on a glass substrate in accordance with the anodic bonding technique.

(2) U.S. Pat. No. 3,397,278, "ANODIC BONDING";
This relates to the anodic bonding technique.

SUMMARY OF THE INVENTION

It is therefore an object of this invention to provide a pressure sensitive apparatus which is free from the disadvantage of the prior art as described above, that is, which has a simple structure with a small number of components and which exhibits a high productivity as well as a high mechanical strength.

The aforecited object can be accomplished by improvements in a pressure transducer having a semiconductor diaphragm assembly, insulating support means, metallic support means, and a metallic housing within which is arranged an integral structure consisting of the three of the semiconductor diaphragm assembly, the insulating support means and the metallic support means, a lower end part of the metallic support means being rigidly fixed to the metallic housing; the improvements comprising the facts that the insulating support means is made of borosilicate glass, while the metallic support means is made of an iron-nickel alloy which has a thermal expansion coefficient substantially similar to that of the borosilicate glass, and that the semiconductor diaphragm assembly, the insulating support means and the metallic support means are mutually bonded by the anodic bonding process.

DETAILED DESCRIPTION OF PREFERRED EMBODIMENTS

Figure 1:
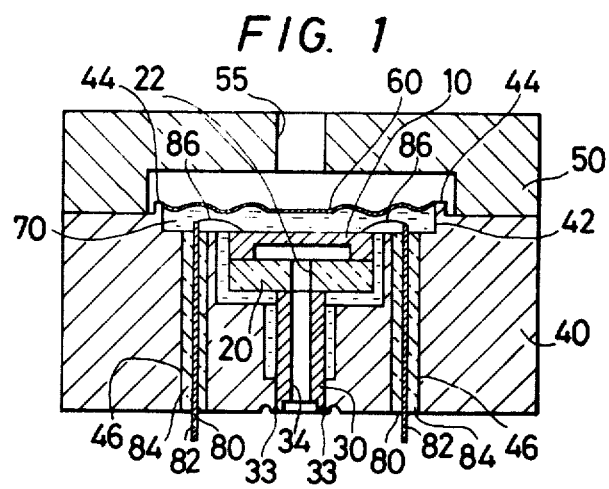
FIG. 1 is a sectional view which shows a pressure sensitive apparatus according to this invention.

Referring to FIG. 1, a pressure sensitive apparatus according to this invention comprises a silicon diaphragm 10 which is formed of a silicon single-crystal plate, which has a flexible diaphragm portion constructed in its central part and which is formed with, for example, a bridge circuit of a strain gauge on the surface of the diaphragm portion; an insulating support 20 which is made of an insulator such as borosilicate glass and which has the silicon diaphragm 10 placed on its upper surface; and a metallic support 30 which is made of a metal such as nickel-iron alloy and whose upper end part has joined thereto the silicon diaphragm 10 and the insulating support 20 that are made integral. The lower end part of the metallic support 30 is rigidly fixed by, for example, welding 33 to a pressure receiving base 40 which is made of, for example, stainless steel and on which a cover member 50 similarly made of stainless steel or the like is rigidly mounted by such means as bolts (not shown). Reference numeral 55 designates a pressure introducing port which is provided in the stainless steel cover member 50. The silicon diaphragm 10 and the strain gauge circuit formed thereon are fabricated by methods which have already been well known. As the borosilicate glass to form the insulating support 20, it is desirable to employ glass which is available under the trademark "Pyrex" from Corning Glass Work in U.S. The central part of the insulating support 20 is provided with a penetrant hole 22, through which and a penetrant hole 34 of the tubular metallic support 30 a pressure to-be-measured or a reference pressure is led to one surface of the silicon diaphragm. As apparent from the figure, the central part of the pressure receiving base 40 made of stainless steel is formed with a recess 42 within which is arranged the integral structure consisting of the silicon diaphragm 10, the insulating support 20 and the metallic support 30. The upper end part of the recess is provided with a flange 44, on which a metallic diaphragm 60 made of, for example, stainless steel is mounted by such means as welding. A space which is defined by the metallic diaphragm 60 and the recess 42 formed in the pressure receiving base 40 is filled with a fluid material such as oil 70, through which a pressure to-be-measured or a reference pressure applied to the surface of the metallic diaphragm 60 through the port 55 of the cover member 50 acts on the other surface of the slicon diaphragm 10.

The pressure receiving base 40 is formed with penetrant holes 46, in which glass-sealed terminals 80 are disposed. Glass 84 which is an insulator is packed around conductor terminals 82. The strain gauge circuit formed on the silicon diaphragm 10 is electrically led out through the conductor terminals 82 as well as conductive wires 86.

The diaphragm of silicon 10, the insulating support of borosilicate glass 20 and the metallic support of the iron-nickel alloy 30 are hermetically bonded by the anodic bonding method. As previously stated, the metallic support 30 is joined to the metallic pressure-receiving base 40 with a high mechanical strength and hermetically by welding or any other method. In that case, preferably the metallic support 30 is made sufficiently long in order to prevent a thermal deformation during the welding from exerting a bad influence on the bonded surface between the metallic support 30 and the insulating support 20.

As described above, in the pressure sensitive apparatus according to this invention, the anodic bonding is used to mutually join the silicon diaphragm 10, the glass insulating support 20 and the metallic support 30. In this regard, the joint between the glass insulating support 20 and the metallic support 30 is especially contrived. From the disclosure of U.S. Pat. No. 3,397,278, it is known that when Pyrex glass and a conductive member are to be anodic-bonded, both the members to be joined are held at a temperature between 300° C. and 700° C., the optimum temperature being 400° C., while a voltage of from 500 to 1,000 volts (V) is applied across both the members with the conductive member held at the positive pole and the insulating member held at the negative pole, with the result that both the members are hermetically bonded. It is desirable that both the members to be joined have similar values in the coefficient of thermal expansion.

As materials suited to the above conditions, there are mentioned covar, molybdenum, tungsten etc. It is known, however, that such metal and the Pyrex glass which are anodic-bonded are liable to separate from each other when subjected to an impact. This will be attributed to the fact that the thermal expansion coefficient of such metal is unequal to that of the Pyrex glass or borosilicate glass, the former being lower than the latter.

In the pressure sensitive apparatus according to this invention, the iron-nickel alloy is favorable as the material of the metallic support 20 as stated previously. This iron-nickel alloy has the property that the thermal expansion coefficient thereof varies depending upon the content of nickel. Therefore, an iron-nickel alloy suitable for the present construction has been experimentally searched out.

Figure 2:
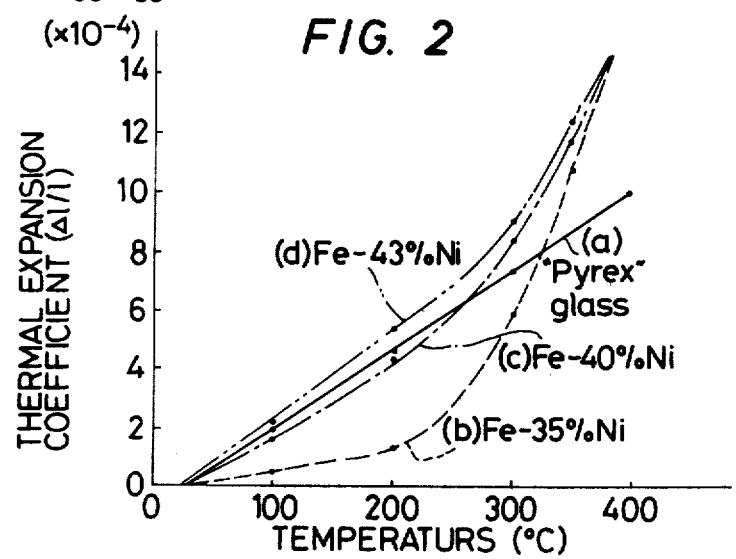
FIG. 2 is a graph which illustrates the thermal expansion characteristics of iron-nickel alloys for better understanding of this invention.

A graph given in FIG. 2 illustrates results which were obtained by measuring the thermal expansion coefficients of iron-nickel alloys with a parameter being the nickel content. In this graph, a solid line (a) indicates the thermal expansion coefficient of the Pyrex glass, a broken line (b) the thermal expansion coefficient of an iron-nickel alloy whose nickel content was 35%, a one-dot chain line (c) the thermal expansion coefficient of an iron-nickel alloy whose nickel content was 40%, and a two-dot chain line (d) the thermal expansion coefficient of an iron-nickel alloy whose nickel content was 43%. It has consequently been found out that the thermal expansion coefficients of the iron-nickel alloys whose nickel contents are from 35 to 43% are feasible for the anodic bonding with the Pyrex glass in a temperature range not exceeding 300° C. In particular, as apparent from the graph, the thermal expansion coefficients of the iron-nickel alloys whose nickel contents are from 39% to 43% are very close to the thermal expansion coefficient of the Pyrex glass in the temperature range not exceeding 300° C., and it has been experimentally confirmed that these iron-nickel alloys are especially appropriate as the material of the metallic support 20. When the nickel content is changed from 36% to 39%, the thermal expansion coefficient of the iron-nickel alloy becomes slightly smaller than that of silicon. It is therefore expected that the silicon diaphragm will be pulled through the glass support after the bonding, resulting in diminution of a nonlinear error.

In anodic-bonding the iron-nickel alloy and the Pyrex glass, at least the alloy side is lapped lest the hermetic sealing should fail after the bonding, whereupon the anodic bonding is carried out at a temperature of below 300° C. by a method as stated below.

The silicon diaphragm 10, the insulating support of the Pyrex glass 20 and the metallic support of the iron-nickel alloy 30 are stacked one over another, and are placed in a constant-temperature oven held at a temperature of approximately 250° C. to 300° C. A d.c. voltage of 1,200 volts (V) is applied with the positive pole allotted to the silicon diaphragm 10 as well as the iron-nickel alloy support 30 and the negative pole allotted to the Pyrex glass insulating support 20. As a result, the three members are integrally bonded, and the bonded state fully satisfies the gas tightness and the mechanical strength which are required as the pressure sensitive apparatus.

Figure 3:
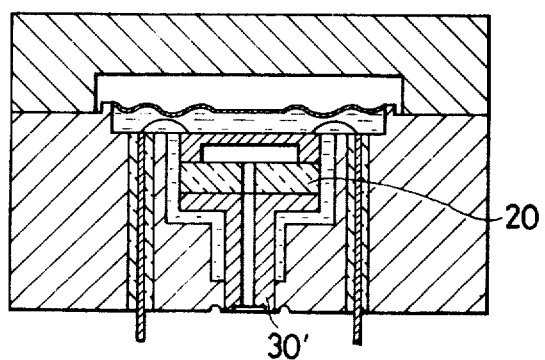
FIG. 3 is a sectional view which shows another embodiment of this invention.

FIG. 3 shows another embodiment of the pressure sensitive apparatus according to this invention. A point of difference from the pressure sensitive apparatus already explained with reference to FIG. 1 is that the upper end part of a metallic support 30' made of the iron-nickel alloy is broad, so the joined surface between the metallic support 30' and the Pyrex glass support 20 has a large area. In this embodiment, accordingly, the bonding between the Pyrex glass support 20 and the metallic support 30' is still more rigid, and it is not destroyed even in such case where a high impact acts. The modified embodiment is therefore greatly effective in durability and in shock resistance.

Although, in the above description, only the borosilicate glass has been exemplified as the glass material for use, any other insulating material can be employed as long as the thermal expansion coefficient thereof is similar to that of silicon.

While we have shown and described the embodiments in accordance with the present invention, it is understood that the same is not limited thereto but is susceptible of numerous changes and modifications as are obvious to those of ordinary skill in the art, and we therefore do not wish to be limited to the details described and shown therein but intend to cover all such changes and modifications as are obvious to those of skill in the art.

What is claimed is:

1. A pressure sensitive apparatus for providing an output in response to a pressure, comprising:
   a semiconductor diaphragm assembly on which a pressure sensitive diaphragm is formed, strain sensitive elements being formed on said pressure sensitive diaphragm and providing an output depending on the pressure applied thereto;
   first supporting means being made of borosilicate glass and having an upper surface on which said semiconductor diaphragm assembly is rigidly and hermetically bonded;

second supporting means being made of an iron-nickel alloy with a nickel content lying within a range of from 35% to 43% and having an upper surface on which said first supporting means integrated with said semiconductor diaphragm assembly is rigidly and hermetically bonded; and housing means, within which said integrated semiconductor diaphragm assembly, said first supporting means and said second supporting means are positioned, and said second supporting means being rigidly fixed to a base of said housing means at the lower end portion thereof, said semiconductor diaphragm assembly being directly bonded to the borosilicate glass of said first supporting means and the iron-nickel alloy of said second supporting means being directly bonded to the borosilicate glass of said first supporting means by anodic bonding.

2. A pressure sensitive apparatus as claimed in claim 1, wherein the anodic bonding is carried out at a temperature within a range of not more than 300° C.

3. A pressure sensitive apparatus as claimed in claim 1, wherein the nickel content of the iron-nickel alloy making said metal supporting means is especially selected to be from 39% to 43%.

4. A pressure sensitive apparatus as claimed in claim 1, wherein said metal supporting means is made of the iron-nickel alloy having a nickel content lying within a range of from 36% to 39%.

5. A pressure sensitive apparatus as claimed in claim 1, wherein said pressure sensitive diaphragm is a silicon diaphragm and said borosilicate glass is anodically bonded to said silicon diaphragm.

6. A pressure sensitive apparatus as claimed in claim 5, wherein said silicon diaphragm is formed of a silicon single crystal plate.

7. A pressure sensitive apparatus as claimed in claim 1, wherein the cross-sectional area of the first supporting means which contacts the second supporting means is larger than the cross-sectional area of the second supporting means.

8. A pressure sensitive apparatus as claimed in claim 1, wherein said housing is made of metal.

* * * * *